No. 62,878. PATENTED MAR. 12, 1867.
G. T. PARRY.
PREVENTING INCRUSTATATION OF STEAM BOILERS.
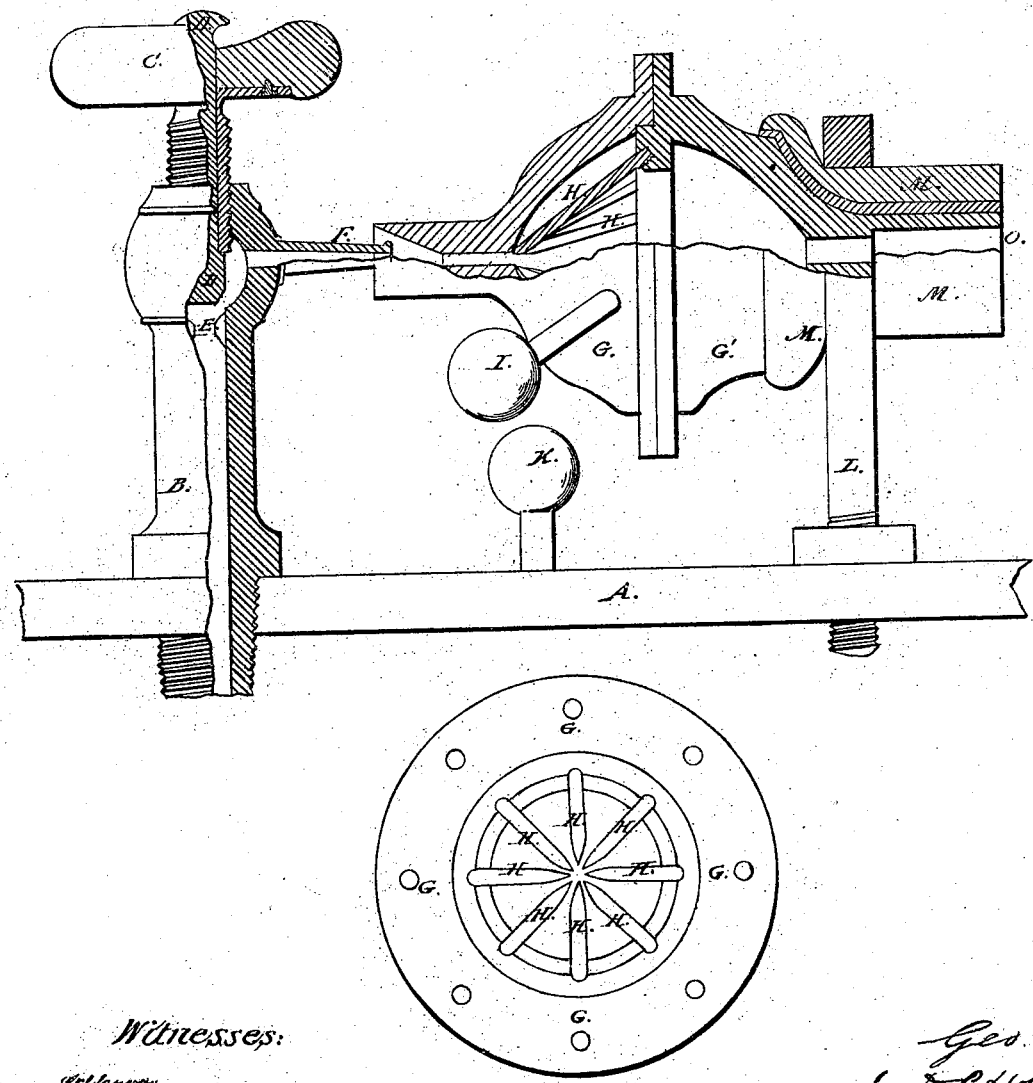
Witnesses:
Inventor.
Geo. T. Parry
by D. P. Holloway & Co
Attorneys

United States Patent Office.

GEORGE T. PARRY, OF PHILADELPHIA, PENNSYLVANIA.

Letters Patent No. 62,878, dated March 12, 1867.

IMPROVEMENT IN PREVENTING INCRUSTATION OF STEAM BOILERS.

The Schedule referred to in these Letters Patent and making part of the same.

TO ALL WHOM IT MAY CONCERN:

Be it known that I, GEORGE T. PARRY, of the city and county of Philadelphia, and State of Pennsylvania, have invented a new and useful Improvement in the Mode of Preventing the Incrustation of Steam Boilers; and I do hereby declare that the following is a full, clear, and exact description of the same, reference being had to the annexed drawings, making part of this specification, in which—

Figure 1 is a side elevation showing part of the interior by vertical section; and Figure 2 is a top view of the lower part of the bulb.

In both figures I employ the same letters in the indication of parts which are identical.

The action of the apparatus described in Letters Patent issued to me, and dated October 31, A. D. 1865, as heretofore constructed and applied, has been always slow in detaching the already existing scale in old boilers to which it has been applied; particularly is this the case in boilers used for the generation of steam of low pressure. The apparatus being suspended within the steam chamber of the generator, is not in any degree within the control of the engineer. I have recently discovered that similar effects may be produced by electricity generated without the boiler, and thence carried, through the medium of conductors, into the boiler, where, acting upon the surface of the boiler and flues, it prevents the formation of scale, and will detach that which may have already formed. One form of apparatus by which this result is effected I will show, which is at all times subject to the observation and within the control of the engineer, who may regulate its action as desired. The generation of electricity by the passage of a jet of steam over an insulated brush of points is well known, and is not claimed as my invention, which consists in directing electricity thus generated without the boiler into the same for the purpose of preventing the formation of scale and detaching that which may be already formed.

A is the boiler-head or other part of the shell of a boiler, B a try cock, which should be inserted above but near the ordinary water level, as the electrical effect of dry steam is greater than that of wet steam. C is a screw by which the valve D, passing through it, is pressed against or released from the valve-seat E. When this valve is opened the steam jets from the pipe F, entering the upper end of the bulb G. This bulb is hollow, and formed in two parts, G and G', bolted together, so as to form a steam-tight joint. A flange is formed within the lower part G', or a ring is fitted within the same, supporting the inwardly inclined pointed wires H. These wires are made of iron or steel, preferably the latter. Experiments heretofore made indicate that these wires should be magnetized, and in such manner that the points will attract the south pole of the magnetic needle. I therefore use pointed steel wires permanently magnetized as above. The lower part of the section G' of the bulb is extended, forming a neck, which is enclosed by a glass insulator, M. M' represents plaster of Paris poured around the neck of the bulb to attach it to the insulator. The bulb and insulator are sustained by the eye-bolt L, which is attached to the boiler, the eye enclosing the insulator. The steam jetting from the pipe F, enters the bulb and impinges against the points H, and passing through the bulb escapes at the orifice O, thus exciting electricity, which, passing from the ball or point I to K, is conducted into the boiler, whence diffusing itself over the surfaces it escapes through a copper wire inserted into the boiler at its opposite extremity, and by its action detaching scale already formed and preventing the deposit of new scale. The electricity thus generated is subject to the discretionary control of the engineer, who may regulate at will its intensity and duration. It is evident that the form of this apparatus may be indefinitely varied, as also the mode of applying the insulators. I do not therefore confine my claim to the form of construction here set forth, but without regard to the peculiar form and precise arrangement of the respective parts. What I do claim as my invention, and desire to secure by Letters Patent, is—

1. The mode, substantially as described, of removing the scale from and preventing the incrustation of boilers, by means of electricity generated without the boilers by jets of steam impinging upon one or more points, or equivalent means, said electricity being conducted into the boiler by suitable means.

2. The combination of the try-cock B and the insulated brush of points H, set in the bulb G, or its equivalent, when connected by a suitable conductor, K, with the shell of the boiler, and arranged to operate substantially in the manner and for the purpose set forth.

In testimony whereof I have signed my name to this specification in the presence of two subscribing witnesses.

GEORGE T. PARRY.

Witnesses:
R. MASON,
C. F. CLAUSEN.